No. 679,285. Patented July 30, 1901.
F. M. ALLEN.
CALF TROUGH AND RACK.
(Application filed Dec. 15, 1900.)
(No Model.)
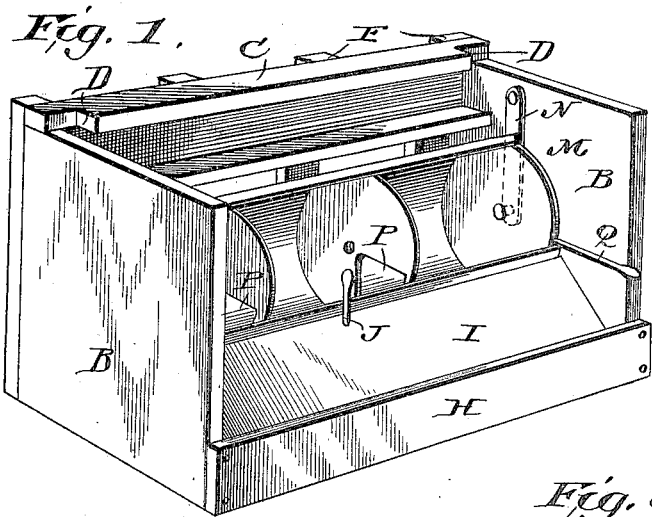
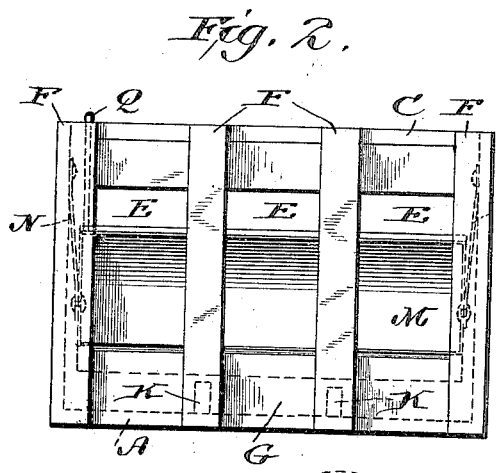
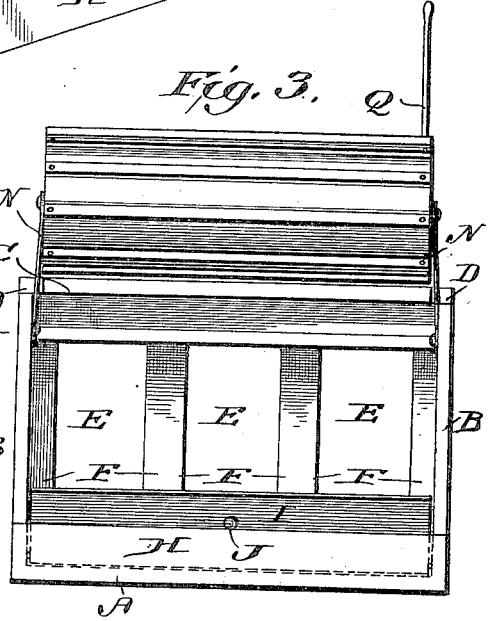
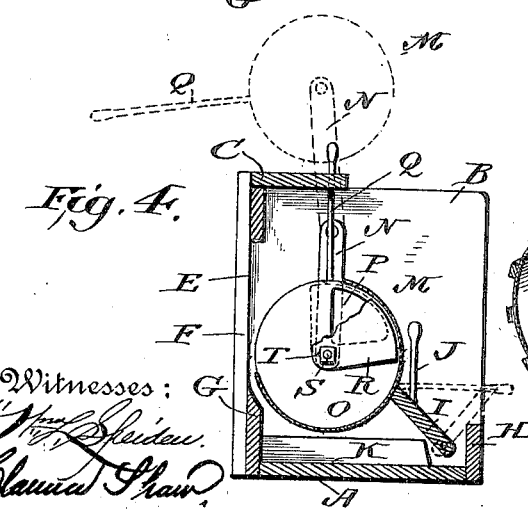
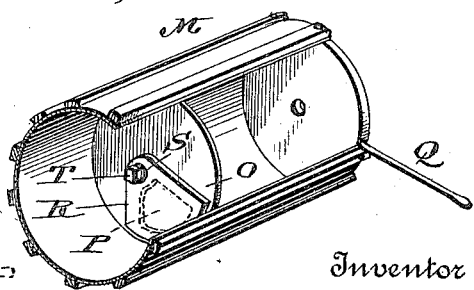
Witnesses:
Inventor: Fred M. Allen,
By Attorneys.

UNITED STATES PATENT OFFICE.

FRED MILTON ALLEN, OF ESMOND, ILLINOIS, ASSIGNOR OF ONE-THIRD TO LEON W. RAND, OF SAME PLACE.

CALF TROUGH AND RACK.

SPECIFICATION forming part of Letters Patent No. 679,285, dated July 30, 1901.

Application filed December 15, 1900. Serial No. 40,047. (No model.)

*To all whom it may concern:*

Be it known that I, FRED MILTON ALLEN, a citizen of the United States, residing at Esmond, in the county of Dekalb and State of Illinois, have invented a new and useful Calf Trough and Rack, of which the following is a specification.

This invention relates to improvements in stock-troughs; and one object is to provide a trough for the purpose of holding either solid or liquid food or solid food and water, the trough being so constructed that it may be readily adapted for use either to contain grain or other similar food or liquid food, such as milk, or to contain drinking-water.

Another object is to so construct the trough that when used to supply drinking-water or liquid food such liquid when poured thereinto will divide itself, so as to provide each of the compartments with an equal supply.

A further object is to provide a trough with simple and convenient means for closing any desired number of feeding-openings, so as to adapt the trough for any desired number of animals within its capacity.

With the above objects in view the invention consists in the novel features of construction hereinafter fully described, particularly pointed out in the claims, and clearly illustrated by the accompanying drawings, in which—

Figure 1 is a rear perspective view showing the liquid-receptacle in position to receive the supply of liquid; Fig. 2, a front elevation of the trough with the liquid-receptacle in position to permit its contents to be withdrawn by the animals; Fig. 3, a rear elevation showing the trough adapted for use as a feed-trough for solid food; Fig. 4, a transverse section of Fig. 2; and Fig. 5, a view showing the cut-off in position, closing some of the openings to the trough.

The trough consists of a box-like body having the bottom A and side walls B B connected at their upper edges at the front edge of the box by a cross-piece C, which is recessed or cut away at its respective ends and on its inner edge, as illustrated at D. The front of the box is divided into a plurality of openings E by vertically-arranged cleats F. The bottom A is provided at its front edge with a retaining-cleat G and at the rear end of the box with a cleat H, which forms a stop to limit the rearward movement of a swinging board I. This board is pivoted near its lower edge to the sides of the box and constitutes a retaining-strip for locking the liquid-receptacle in position in the box and also as the rear retaining-strip for the trough for containing the solid food. This swinging board is provided with a handle J, by means of which it is swung either forwardly or rearwardly to perform the functions above set forth. As before stated, the cleat H serves as a stop to limit the rearward movement of this board I, while cleats K, secured to the bottom of the box, perform similar functions in respect to the forward movement of the board. These cleats extend transversely of the box and form, upon the bottom wall thereof, a number of compartments, corresponding in number to the number of openings in the front wall of the box, and in these compartments the solid food—such as oats, hay, &c.—is placed.

M designates the liquid-receptacle, which is in the form of a cylinder of such size as to fit in said box between the side walls thereof. This cylinder is pivoted at its respective ends to arms N, which at their upper ends are in turn pivoted to the side walls of the box. The cylinder has a portion of its wall cut away to form a longitudinally-extending opening from end to end thereof and permitting access thereto. Said cylinder is divided into a number of compartments corresponding in number to the openings formed in the front wall of the box by transversely-arranged heads or partitions O, formed with openings P. When the cylinder has been rocked on its supporting-arms to the position illustrated in Fig. 1, these openings P are in the lower portions of the partitions, so that when the liquid is placed therein it will evenly divide itself with the same quantity in each compartment of the receptacle. When, however, the receptacle is swung forwardly, these openings P are then in the upper portion of the partitions, so that the liquid is retained in each compartment and prevented from having access to the next compartment. When said receptacle is rocked in a forward direction, the openings to the compartments formed therein are brought in line with the openings in the front wall of the box, so that the contents of the several compartments of the receptacle may be readily removed therefrom by the animals. As stated, this receptacle may be used either to supply the animals with water or to feed the same liquid food, such as milk. For rocking this receptacle a handle Q is provided, which by abutting against a shoulder formed on cross-piece C and against the swinging board I limits the movement of the receptacle in both directions. The swinging board when moved forwardly prevents the movement of the pivoted arms upon which the receptacle is hung, but permits said receptacle to rock on said arms.

When it is not desired to use the liquid-receptacle, swinging board I is swung rearwardly until it abuts against cleat H. The liquid-receptacle is then swung upwardly and rearwardly out of the box, arms N swinging on the sides of the box until the receptacle rests upon the top board or cross-piece C. In swinging the receptacle to this position, the arms N swing into the recesses in the ends of said cross-piece C.

Should it be desired to close some of the communicating openings in the partitions of the receptacle, I provide plates R, which are of such size as to fit in said receptacle and are placed on the respective sides of the partition. A bolt S is then placed through the two boards and receives a nut T, which draws the same together and securely locks them, closing the communication between the compartments of the receptacle.

Having thus fully described my invention, what I claim as new, and desire to secure by Letters Patent of the United States, is—

1. In a stock-trough, the combination with a box having a plurality of openings in its front wall, of a receptacle pivotally mounted in said box and formed with a plurality of compartments having openings formed therein and adapted to coincide with openings in the box when said receptacle is rocked, said receptacle having openings formed in the dividing-walls of its compartments with the openings so arranged that when the receptacle is swung in position to bring its openings in coincidence with the openings of the box, said openings of the partitions are in the upper portions of said partitions, substantially as described.

2. In a stock-trough, the combination with a box formed with an opening in its front wall, of arms pivoted at their upper ends to the side walls of the box, a receptacle pivotally mounted upon the lower ends of said arms and provided with an opening which is brought into coincidence with the opening of the box, when said receptacle is rocked on the arms, substantially as described.

3. In a stock-trough, the combination with a box having an opening in its front wall, of arms pivoted at their upper ends to the side walls of said box, a receptacle pivotally mounted at the lower end of said arms, and formed with an opening adapted to be brought in coincidence with the opening of the box when the receptacle is rocked, and a swinging board for preventing the swinging of the arms, substantially as described.

4. In a stock-trough, the combination with a box, having an opening formed in its front wall, and a compartment arranged on its bottom wall, of a receptacle arranged in said compartment and formed with an opening to be brought in coincidence with the opening of the box, and pivoted supports for said receptacle, whereby the latter may be swung into and out of said compartment, substantially as described.

5. In a stock-trough, the combination with a box, having an opening in its front wall, and a compartment arranged upon its bottom wall, a swinging rear wall for said compartment, arms pivoted to the side walls of the box, a receptacle pivotally mounted upon said arms and having an opening formed therein adapted to be brought into coincidence with the opening in the wall of the box, when the receptacle is rocked, an operating-lever for said receptacle, stops for limiting the movement of said lever, an operating-handle for said swinging board, and stops for limiting the movement of said board, substantially as described.

6. A stock-trough, comprising a receptacle divided into a plurality of compartments and formed in its partition-walls with communicating openings, plates adapted to close said openings, and securing means for removably attaching said plates to the partitions, substantially as described.

FRED MILTON ALLEN.

Witnesses:
ED SQUIRE,
B. KNAPP.